(12) United States Patent
Kobayashi et al.

(10) Patent No.: US 11,135,861 B2
(45) Date of Patent: Oct. 5, 2021

(54) METHOD FOR MANUFACTURING PRINTING APPARATUS, AND PRINTING APPARATUS

(71) Applicant: SEIKO EPSON CORPORATION, Tokyo (JP)

(72) Inventors: Saori Kobayashi, Shiojiri (JP); So Yokota, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/109,397

(22) Filed: Dec. 2, 2020

(65) Prior Publication Data

US 2021/0162786 A1 Jun. 3, 2021

(30) Foreign Application Priority Data

Dec. 3, 2019 (JP) .............................. JP2019-218556

(51) Int. Cl.
*B41J 29/393* (2006.01)
*H04N 1/00* (2006.01)

(52) U.S. Cl.
CPC ........ *B41J 29/393* (2013.01); *H04N 1/00005* (2013.01); *H04N 1/00045* (2013.01); *H04N 1/00087* (2013.01)

(58) Field of Classification Search
CPC ............... B41J 29/393; H04N 1/00087; H04N 1/00045; H04N 1/00005
See application file for complete search history.

(56) References Cited

U.S. PATENT DOCUMENTS 7,773,774 B2 8/2010 Rasmussen et al.
2018/0272746 A1* 9/2018 Yokota ................... B41J 2/2135

FOREIGN PATENT DOCUMENTS

JP 2006014332 A 1/2006

* cited by examiner

*Primary Examiner* — Christopher Wait
(74) *Attorney, Agent, or Firm* — Chip Law Group

(57) ABSTRACT

A printing apparatus provided with a detection circuit executes: printing a first undercoat color on a printing medium; performing a calibration with respect to the printed first undercoat color; printing an adjustment pattern using a first pattern color that has a complementary-color relationship with the first undercoat color; detecting the adjustment pattern using the detection circuit; and making an adjustment based on the detected adjustment pattern.

6 Claims, 6 Drawing Sheets

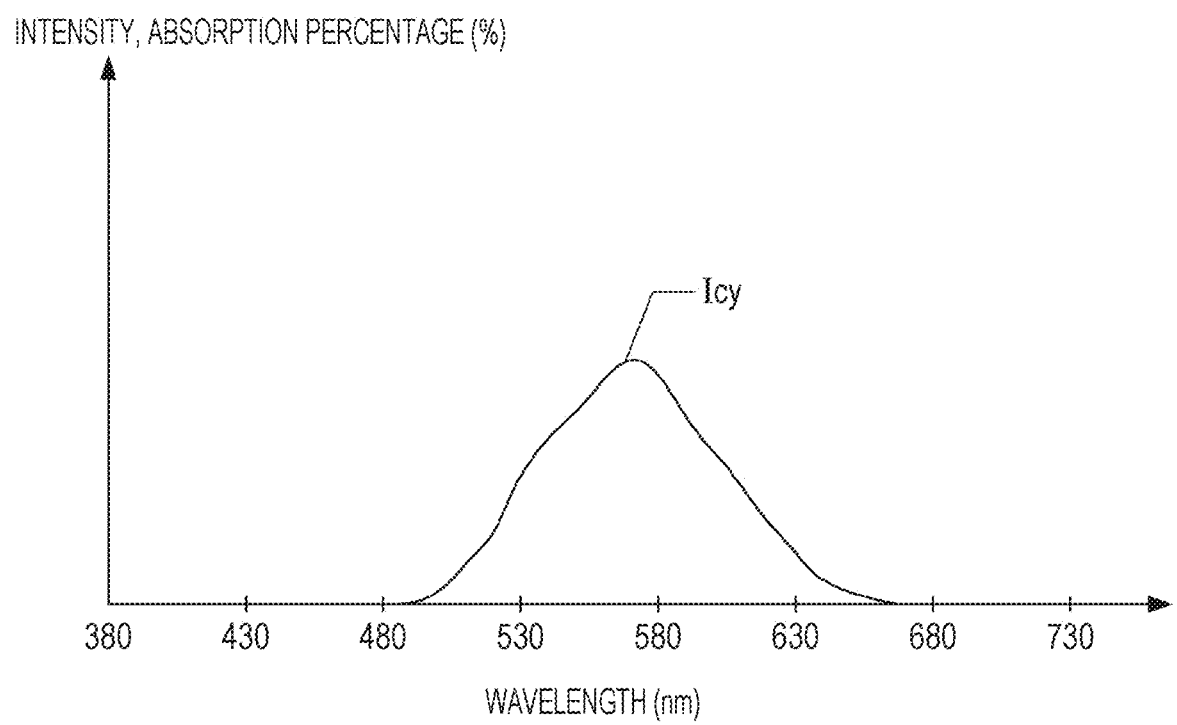

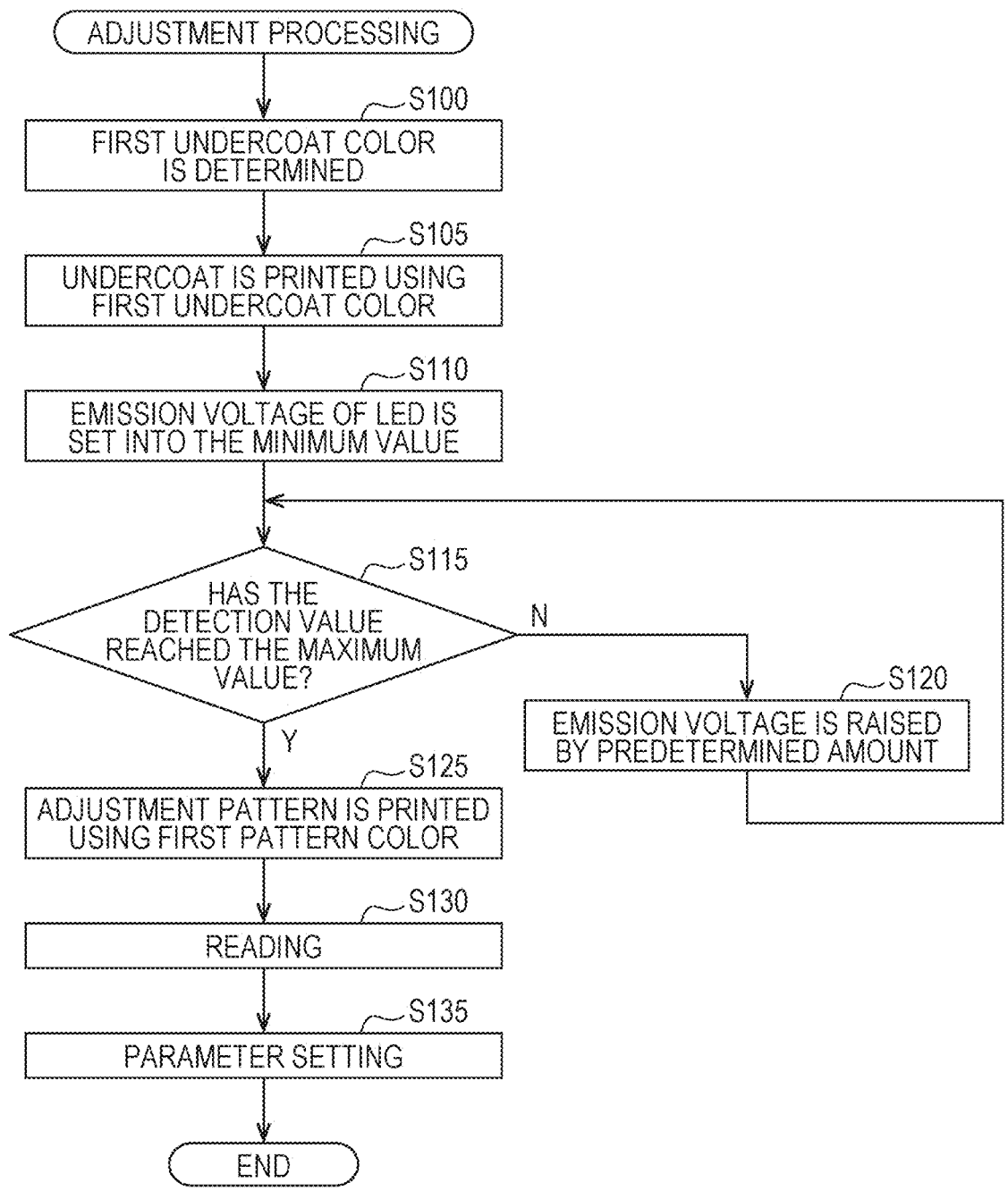

METHOD FOR MANUFACTURING PRINTING APPARATUS, AND PRINTING APPARATUS

The present application is based on, and claims priority from JP Application Serial Number 2019-218556, filed Dec. 3, 2019, the disclosure of which is hereby incorporated by reference herein in its entirety.

BACKGROUND

1. Technical Field

Embodiments of the present disclosure relate to a method for manufacturing a printing apparatus, and a printing apparatus.

2. Related Art

A printing apparatus capable of improving the quality of an image by adjusting a variable adjustment amount is known in the art. For example, a technique for generating a test pattern is disclosed in JP-A-2006-014332.

If the color of an adjustment pattern printed by a printing apparatus is hard to read, sufficient information that should be read cannot be taken out of the adjustment pattern. If so, it is difficult to manufacture a printing apparatus that is capable of performing printing with high quality. If necessary information can be obtained from an adjustment pattern easily, it will become possible to make an adjustment with higher precision with a smaller amount of printing.

SUMMARY

Provided by one aspect of the present disclosure is a method for manufacturing a printing apparatus provided with a detection circuit, the method comprising: printing a first undercoat color on a printing medium; performing a calibration with respect to the printed first undercoat color; printing an adjustment pattern using a first pattern color that has a complementary-color relationship with the first undercoat color; detecting the adjustment pattern using the detection circuit after performing the calibration; and making an adjustment based on the detected adjustment pattern.

When ink is printed on a printing medium by a printing apparatus, a color that is different from a base color, which is the color of the printing medium itself, is visually recognized because some of the spectrum corresponding to the absorption characteristics of the ink is absorbed from the base color of the printing medium. That is, among the wavelengths of light reflected from the printing medium, wavelengths at which the absorption characteristics of the ink are high are absorbed, and the color arising from the non-absorbed part of the spectrum is recognized. Therefore, when an undercoat is formed using the first undercoat color, light of a particular wavelength band is absorbed by the first undercoat color, resulting in darker color perception as compared with the base color of the printing medium (e.g., white). Therefore, if a calibration is performed with respect to the first undercoat color after printing an undercoat of the first undercoat color, the detectable range of a detection circuit gets adjusted such that lightness in a narrower range will be detected, as compared with when a calibration is performed with respect to the base color.

When printing using the first pattern color is further performed on the printing medium on which the undercoat of the first undercoat color has been printed, among the wavelengths of light that are not absorbed by the first undercoat color, wavelengths at which the absorption characteristics of the ink of the first pattern color are high are further absorbed. Therefore, at the portion where both the printing using the first undercoat color and the printing using the first pattern color have been performed, a color (hereinafter referred to as "mixed color") that is different from the first undercoat color is recognized with increased darkness. Consequently, on the printing medium on which the undercoat of the first undercoat color has been printed, an adjustment pattern formed of the mixed color that is darker than the first undercoat color is present against the background of the first undercoat color.

The mixed color is a dark color. If a calibration is performed with respect to the base color of the printing medium, it is difficult for a detection circuit to detect it (a detection value is small). However, if a calibration is performed with respect to the first undercoat color, it becomes easier to detect a darker color because the first undercoat color with respect to which the calibration is performed is darker than the base color. Therefore, reading the adjustment pattern by the calibrated detection circuit makes it easier to detect the mixed color that is darker than the first undercoat color. That is, it becomes easier to read the adjustment pattern.

The first undercoat color may be cyan, and the first pattern color may be yellow. This configuration makes it easier to read the adjustment pattern using yellow, which is relatively hard to read.

The calibration may be performed by adjusting an amplification factor of an output of a sensor of the detection circuit. This configuration makes it possible to perform the calibration easily.

The calibration may be an adjustment of an amount of light emitted from a light source that is turned on when detection is performed by the detection circuit. This configuration makes it possible to perform the calibration easily.

The detection circuit may be a circuit that acquires lightness of a surface of the printing medium. This configuration makes it possible to easily acquire information for making an adjustment based on the adjustment pattern.

The following configuration may be adopted: A printing apparatus, comprising: a detection circuit; wherein a first undercoat color is printed on a printing medium; a calibration is performed with respect to the printed first undercoat color; an adjustment pattern is printed using a first pattern color that has a complementary-color relationship with the first undercoat color; the adjustment pattern is detected using the detection circuit; an adjustment is made based on the detected adjustment pattern; and printing is performed in accordance with setting after the adjustment. That is, a printing apparatus capable of printing the adjustment pattern efficiently may be provided.

BRIEF DESCRIPTION OF THE DRAWINGS

FIG. 8 is a diagram for explaining the distribution of, after absorption by cyan ink, light after absorption by yellow ink.

FIG. 9 is a flowchart of adjustment processing.

DESCRIPTION OF EXEMPLARY EMBODIMENTS

Exemplary embodiments of the present disclosure will now be explained in the following order.
(1) First embodiment
(2) Printing an adjustment pattern
(3) Adjustment processing
(4) Other embodiments

(1) First Embodiment

Figure 1:
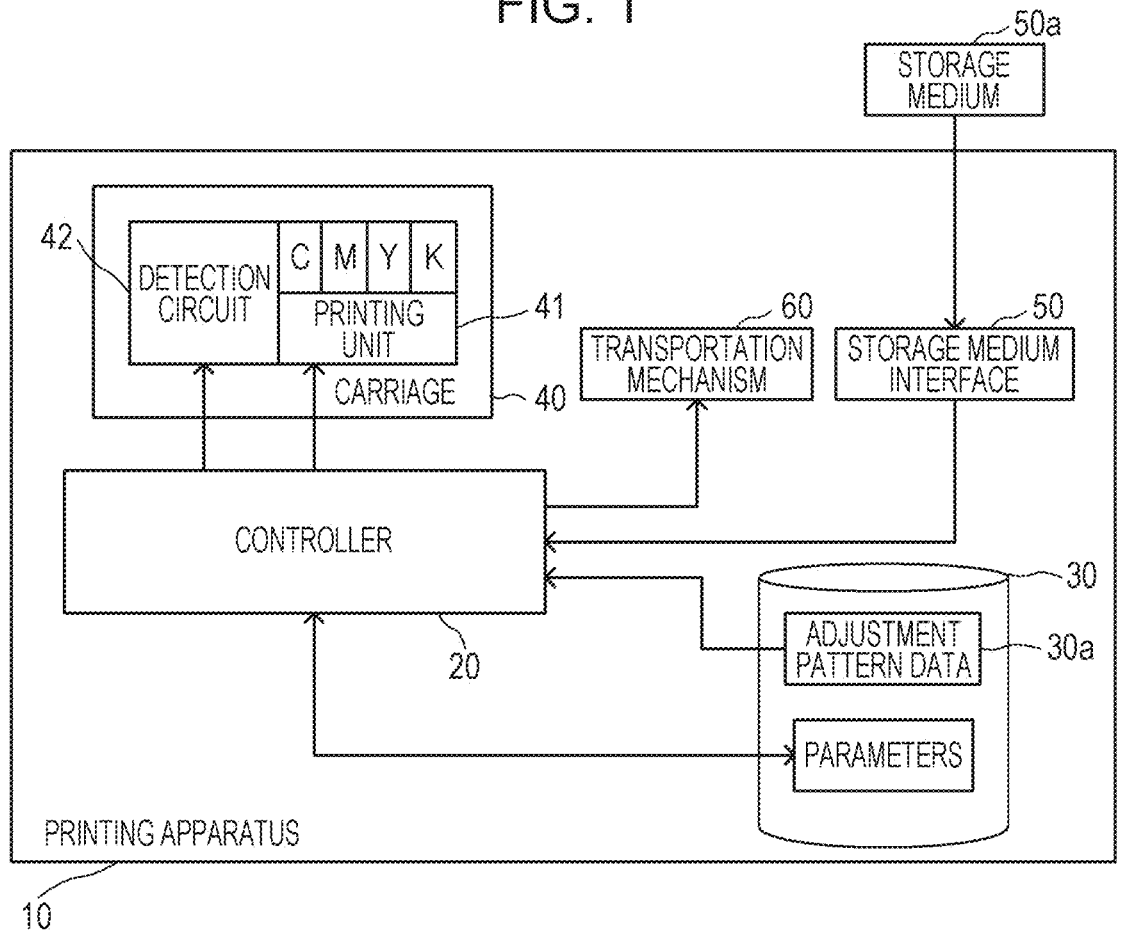
FIG. 1 is a block diagram of a printing apparatus according to an exemplary embodiment of the present disclosure.

FIG. 1 is a block diagram that illustrates the configuration of a printing apparatus 10 according to an exemplary embodiment of the present disclosure. The printing apparatus 10 includes a controller 20 and a nonvolatile memory 30. The controller 20 includes a RAM, and a processor such as a CPU. A print control program and an adjustment program, which are stored in the nonvolatile memory 30, are able to be run on the controller 20. Any storage medium can be used as the nonvolatile memory 30 as long as the stored content is retained even after the printing apparatus 10 is powered off. Therefore, a storage medium of other kind, instead of the memory, may be used.

When the print control program is run, the controller 20 is able to control a printing unit 41 and a transportation mechanism 60, etc. to print an image on a printing medium. The adjustment program is a program for adjusting variable factors in the printing apparatus 10 in order to prevent a decrease in print quality due to an error occurring in the printing apparatus 10. When the adjustment program is run, the controller 20 is able to control the printing unit 41 and the transportation mechanism 60, etc. to print an adjustment pattern on a printing medium. The controller 20 is able to control a detection circuit 42 and the transportation mechanism 60, etc. to read the printing medium.

The printing apparatus 10 according to the present embodiment is an ink-jet printer. The printing apparatus 10 includes a carriage 40, a storage medium interface 50, and the transportation mechanism 60. A portable storage medium 50a can be attached to the storage medium interface 50. The controller 20 is able to acquire various kinds of data including image data from the attached storage medium 50a. Needless to mention, the source from which the image data, etc. is acquired is not limited to the portable storage medium 50a. The image data, etc. may be acquired from a computer connected via wired or wireless communication, etc. Various kinds of configuration can be adopted.

The transportation mechanism 60 is a device that transports a printing medium in a predetermined direction. The controller 20 is able to control the transportation mechanism 60 to transport a printing medium in a predetermined procedure. The printing unit 41 and the detection circuit 42 are mounted on the carriage 40. The controller 20 is able to cause the carriage 40 to reciprocate in a predetermined direction. In the printing apparatus 10, the carriage 40 is designed to move in the predetermined direction while being kept at a predetermined distance from a platen.

The printing unit 41 includes a print head and ink tanks. The print head ejects ink of four types of color, which are CMYK (C: cyan, M: magenta, Y: yellow, K: black). The ink tanks are attached to the print head and contain the ink of CMYK respectively. Needless to mention, these ink colors, and the number of the colors, are nothing more than an example. Ink of other types of color and other number of colors may be used instead. The print head has a plurality of ejection nozzles arranged in a direction orthogonal to the direction of movement of the carriage 40. The controller 20 is able to control the amount of ink ejected from each ejection nozzle, the timing of ejection, etc.

Therefore, it is possible to print an image on a printing medium by ejecting ink of the colors from the ejection nozzles in the process of moving the carriage 40 in the predetermined direction. It is possible to print an image at a targeted position in a printable area on a printing medium by repeating the transportation of the printing medium by the transportation mechanism 60, the movement of the carriage 40, and the ejection of ink from the print head. In the present embodiment, the direction in which a printing medium is transported is referred to as sub-scan direction, and the direction in which the carriage 40 moves is referred to as main-scan direction.

The detection circuit 42 has a function of detecting the lightness of a printing medium on the platen. In the present embodiment, on the carriage 40, the detection circuit 42 is provided next to the print head of the printing unit 41 in the main-scan direction. Therefore, the controller 20 is able to move the detection circuit 42 in the main-scan direction by moving the carriage 40. In the present embodiment, because of the movement of the detection circuit 42, the entirety of the printable area on the printing medium in the main-scan direction can be captured within the field of vision. Accordingly, the printed image can be read no matter where in the main-scan direction it is printed.

(2) Printing an Adjustment Pattern

In the present embodiment, the result of reading by the detection circuit 42 can be used for keeping or enhancing print quality. The printing apparatus 10 according to the present embodiment will be able to perform printing with predetermined expected quality if components such as the carriage 40 and the transportation mechanism 60, etc. have sizes as designed, are assembled as designed, and operate as designed. However, a decrease in print quality could happen due to a possible error in at least a part of these factors. To avoid such a decrease in print quality, the printing apparatus 10 according to the present embodiment is configured such that it is possible to make adjustments for various kinds of target of adjustment corresponding to the error factors. The adjustments can be made as a part of the processes of manufacturing the printing apparatus 10 at a factory. The adjustments can be made as a part of the processes of remanufacturing the printing apparatus 10 the print quality of which has decreased due to, for example, deterioration over time.

Specifically, for example, in the printing apparatus 10, the carriage 40 is designed to move in the main-scan direction while keeping a distance between the carriage 40 and a printing medium (i.e., platen gap) at a predetermined value. However, the actual platen gap could be different from the predetermined value, for example, due to a possible deviation in position and/or shape of the platen from the design or due to a possible deviation in position and/or moving direction of the carriage 40 from the design.

Figure 2:
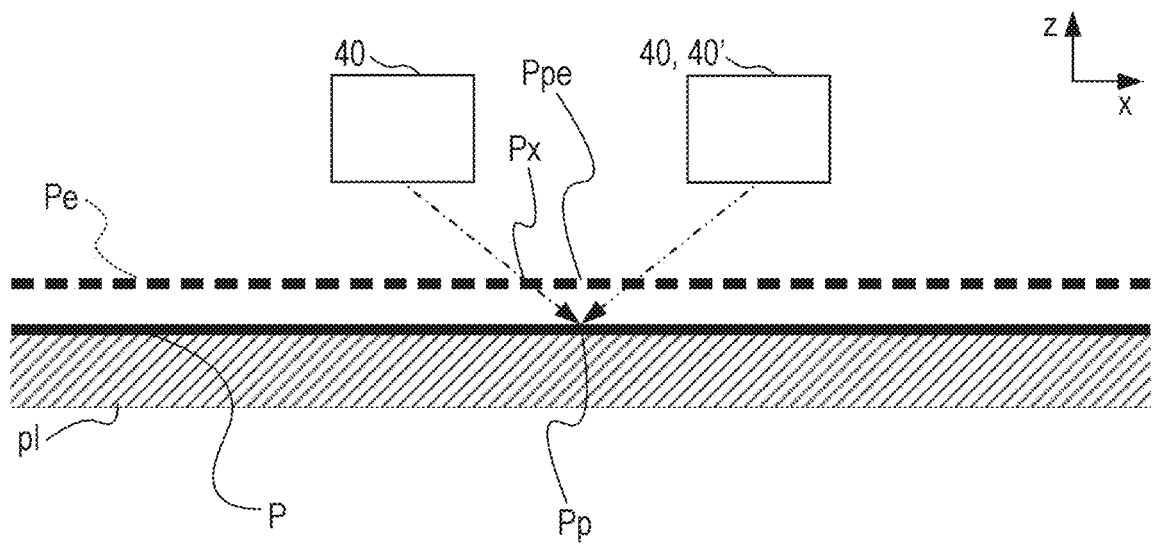
FIG. 2 is a diagram for explaining misalignment in print position of ink ejected from a carriage.

FIG. 2 is a schematic view of a structure in the neighborhood of the carriage 40 and a platen pl. In FIG. 2, x denotes the main-scan direction, and z denotes the direction perpendicular to the print surface. Therefore, the sub-scan direction is the figure's depth direction perpendicular to the x direction and the z direction. In the present embodiment, the sub-scan direction is referred to also as y direction. In FIG. 2, the platen pl is shown by hatching, and the thick solid straight line represents a printing medium P on the platen pl.

In FIG. 2, a print mode in which the carriage 40 reciprocates in the main-scan direction is supposed. That is, the carriage 40 is able to eject ink while moving in the x direction and is further able to eject ink while moving in the direction that is the opposite of the x direction. In FIG. 2, the dot-and-dash line indicates the trajectory of an ejected ink droplet traveling in air from the carriage 40 moving in the x direction toward a print position pp, and the double-dotted dashed line indicates the trajectory of an ejected ink droplet traveling in air from the carriage 40 moving in the direction that is the opposite of the x direction toward the print position pp.

Each of the traveling trajectory indicated by the dot-and-dash line and the traveling trajectory indicated by the double-dotted dashed line is an example of a case where the platen gap and the moving speed in the printing apparatus 10 are as designed and thus where printing is performed with predetermined expected quality with the recording of the ink at the print position pp. If they are as designed, the ink droplet ejected toward the print position pp lands at the print position pp regardless of whether the carriage 40 moves in the x direction or in the direction that is the opposite of the x direction. However, if any component of the printing apparatus 10 contains an error with a deviation from the design, an error could occur in the position where the ink is recorded.

In FIG. 2, the thick broken line schematically represents a printing medium Pe when there is an error in the platen gap. When there is an error in the platen gap, if ink is ejected as designed as indicated by the dot-and-dash line and the double-dotted dashed line, the ink will not be recorded at a designed print position Ppe. Therefore, in the present embodiment, an adjustment is made while taking, as the target of adjustment, at least one of variable factors in the printing apparatus 10, thereby bringing print quality into predetermined expected quality or equivalent to predetermined expected quality. For example, in the example illustrated in FIG. 2, misalignment in print position due to deviation from the design of the platen gap will be eliminated if ink is ejected from the carriage 40 (40') moving in the direction that is the opposite of the x direction so that the ink will be recorded at a print position Px.

The target of adjustment in the present embodiment is a factor that could change the result of printing by selecting the amount of adjustment. Examples of such factors are: the timing of ejecting ink, the speed of moving the print head, the amount of ink ejected, the waveform and magnitude of a voltage for ejecting ink, the amount of feeding a sheet. In the present embodiment, one of these factors is taken as the target of adjustment, and an ideal adjustment amount is determined by printing an adjustment pattern that is constituted of a plurality of patterns whose amount of adjustment of the target of adjustment is varied. In the following description, when it is intended to distinguish a part of an adjustment pattern from a whole of the adjustment pattern, each individual part printed with the same amount of adjustment in patterned arrangement is simply referred to as "pattern", and the entire series of patterned arrangement formed by the plurality of patterns is referred to as "adjustment pattern".

Figure 3:
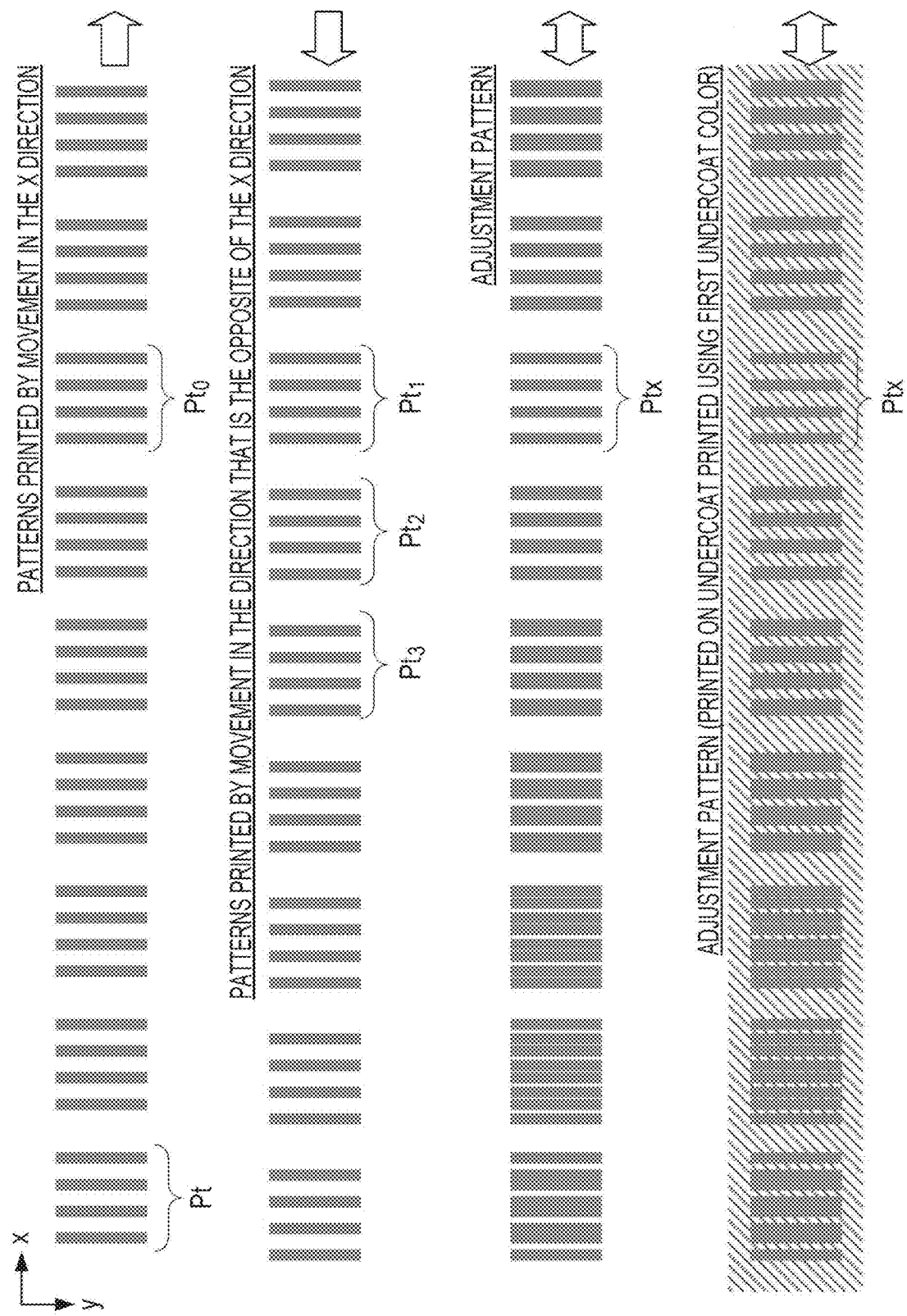
FIG. 3 is a diagram for explaining an adjustment pattern.

The adjustment pattern according to the present embodiment includes patterns printed with the amount of adjustment that is not different from setting and patterns printed while making the amount of adjustment different from the setting. The adjustment pattern according to the present embodiment is configured such that an ideal adjustment amount can be determined by examining the degree of overlapping of the former with the latter. FIG. 3 is a diagram for explaining an adjustment pattern. The adjustment pattern illustrated in FIG. 3 is printed for the purpose of eliminating an error in print position when the carriage 40 is moved in the x direction and in the direction that is the opposite of the x direction.

Specifically, the adjustment pattern illustrated in FIG. 3 is used for clearly visualizing the misalignment in print position arising between the directions that are the opposite of each other when the carriage 40 reciprocates. The adjustment pattern illustrated in FIG. 3 is printed by reciprocation of the carriage 40. In FIG. 3, an example of the adjustment pattern printed by the printing apparatus 10 according to the present embodiment is shown at the bottom row. In the bottom row, hatching indicates that an undercoat is printed on a printing medium. An adjustment pattern illustrated at the second row from the bottom in FIG. 3 is shown for the purpose of comparison, representing an adjustment pattern formed without printing an undercoat. In addition, in FIG. 3, among the patterns that constitute the adjustment pattern, patterns that are printed when the carriage 40 moves in the x direction are shown at the top row, and patterns that are printed when the carriage 40 moves in the direction that is the opposite of the x direction are shown at the second row from the top.

In the adjustment pattern illustrated in FIG. 3, each one pattern (for example, a pattern Pt in the top row in FIG. 3) is formed by arranging a plurality of line segments at predetermined intervals in the main-scan direction, wherein each of the plurality of line segments extends in the sub-scan direction (y direction). In the example illustrated in FIG. 3, nine patterns explained here are printed next to one another in a row. The color of the bars constituting each pattern is not specifically limited. In the example explained here, it is assumed that the bars constituting each pattern are printed using Y ink. In FIG. 3, each of the bars is illustrated as a gray line segment so as to mean that its ink color is Y.

In this example, the amount of adjustment when the carriage 40 moves in the x direction is not varied from a predetermined adjustment amount. Therefore, as shown at the top row in FIG. 3, a bar-to-bar pitch in each pattern Pt is constant, and a pattern-to-pattern pitch between two adjacent patterns Pt is also constant. In the adjustment pattern illustrated in FIG. 3, each one pattern printed using Y ink when the carriage 40 moves in the direction that is the opposite of the x direction is also formed by arranging a plurality of line segments at predetermined intervals in the main-scan direction, wherein each of the plurality of line segments extends in the sub-scan direction (y direction). Nine patterns explained here are arranged in the main-scan direction. The amount of adjustment for these opposite-direction patterns is made different from the predetermined adjustment amount, varying from one to another of the nine patterns, such that the change in the amount of adjustment increases from one end to the other end in the main-scan direction.

For example, in the example shown at the second row from the top in FIG. 3, the timing of ejecting ink is different from one to another of patterns $Pt_1$, $Pt_2$, and $Pt_3$. Specifically, the timing of ejecting ink for the pattern $Pt_1$ is relatively delayed in comparison with the timing of ejecting ink for the pattern $Pt_2$, and the timing of ejecting ink for the pattern $Pt_2$ is relatively delayed in comparison with the timing of ejecting ink for the pattern $Pt_3$. As explained above, in the adjustment pattern according to the present embodiment, the timing of ejecting ink, as the amount of adjustment, varies gradually in accordance with the order of arrangement of the individual patterns.

The adjustment pattern illustrated at the second row from the bottom and at the bottom row in FIG. 3 is obtained by overlapping the patterns printed when the carriage 40 moves in the x direction with the patterns printed when the carriage 40 moves in the direction that is the opposite of the x direction. In the present embodiment, the undercoat is printed using C ink. That is, in the adjustment pattern illustrated at the bottom row in FIG. 3, cyan is a first undercoat color, and yellow is a first pattern color. The hatched portion schematically shows the undercoat that is printed in cyan.

In the adjustment pattern explained here, as illustrated in FIG. 3, a bar will be thin if ink ejected during movement in the x direction and ink ejected during movement in the direction that is the opposite of the x direction match. A bar will be thick if the two do not match due to misalignment. For example, in the example illustrated in FIG. 3, a comparison of the patterns printed when the carriage 40 moves in the x direction with the patterns printed when the carriage 40 moves in the direction that is the opposite of the x direction reveals that the misalignment is the minimum between a pattern $Pt_0$ in the former and a pattern $Pt_1$ in the latter. Therefore, in the adjustment pattern illustrated at the second row from the bottom and at the bottom row in FIG. 3, the lightness of a pattern Ptx is highest. Therefore, in the pattern example illustrated in FIG. 3, the timing of ejecting ink for the pattern Ptx, which has the highest lightness among the individual patterns, can be said to be most ideal.

The amount of adjustment is varied at a change pitch determined in advance within a range determined in advance when the carriage 40 moves in the direction that is the opposite of the x direction. Each of the nine patterns printed by moving the carriage 40 in the direction that is the opposite of the x direction is associated with the amount of adjustment applied when the pattern is printed. By finding the pattern that has the highest lightness among those in the adjustment pattern, therefore, it is possible to determine the amount of adjustment corresponding to the found pattern as an ideal adjustment amount.

The adjustment pattern explained above is used for adjusting the mismatch in the timing of ejecting ink when the carriage 40 reciprocates. Adjustment pattern data 30a representing patterns for making a predetermined adjustment has been stored in the nonvolatile memory 30 in advance. Needless to mention, however, various kinds of other adjustment pattern may be used. Anyway, in the present embodiment, it is possible to determine an ideal adjustment amount by utilizing the overlapping of patterns printed with the amount of adjustment that is not different from setting and patterns printed while making the amount of adjustment different from the setting.

Figure 4:
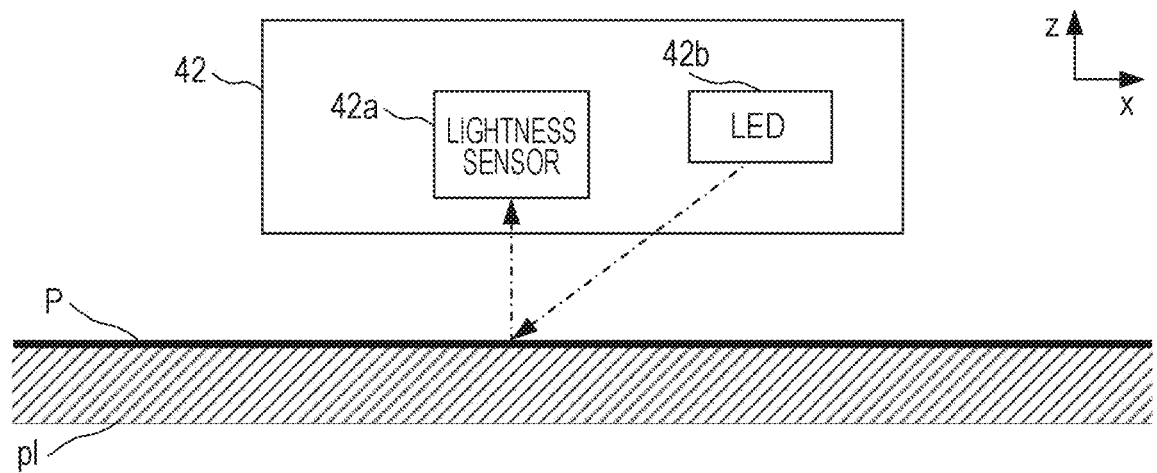
FIG. 4 is a diagram for explaining a detection circuit.

For the purpose of determining the above-described adjustment amount and making settings automatically, the printing apparatus 10 according to the present embodiment is equipped with the detection circuit 42. FIG. 4 schematically illustrates the configuration of the detection circuit 42. In FIG. 4, the detection circuit 42, the printing medium P, and the platen pl are schematically illustrated. In FIG. 4, x denotes the main-scan direction, and z denotes the direction perpendicular to the print surface.

As illustrated in FIG. 4, the detection circuit 42 according to the present embodiment includes a lightness sensor 42a and an LED 42b. In the present embodiment, the lightness sensor 42a needs only to be able to detect the lightness (density) of each of patterns that constitute an adjustment pattern. For example, the lightness sensor 42a is a photodiode. In the present embodiment, since the misalignment becomes clear based on the lightness of the adjustment pattern, the lightness is detected by the lightness sensor 42a. Needless to mention, however, any other kind of sensor may be used if any other feature in the adjustment pattern should be detected. For example, an area sensor such as a CMOS or a CCD may be used.

The LED 42b is a light source for lighting the area of detection by the lightness sensor 42a. In FIG. 4, light emitted from the LED 42b and reaching the lightness sensor 42a is schematically indicated by dot-and-dash line arrows. When the printing medium P with the adjustment pattern printed thereon is lit by the LED 42b, light corresponding to the lit adjustment pattern reaches the lightness sensor 42a. Based on an output signal from the lightness sensor 42a, the controller 20 detects the lightness of the adjustment pattern.

The controller 20 detects the lightness of each of the patterns that constitute the adjustment pattern (in the example illustrated in FIG. 3, the nine patterns in the bottom row), and determines the pattern that has the highest lightness. Then, the controller 20 acquires the amount of adjustment associated with the pattern that has the highest lightness, thereby determining a parameter (value indicating the amount of adjustment) that should be set when printing is performed. The light source is not limited to an LED. It is sufficient as long as the light is white light. That is, any other type of a light source may be used. The detection circuit 42 may include other component, for example, an optical component such as a lens.

As explained above, in the present embodiment, an ideal adjustment amount is determined based on the lightness of an adjustment pattern. Therefore, it is necessary to detect a change in lightness of the adjustment pattern with high precision, based on the output of the lightness sensor 42a. However, depending on the color of ink used for printing the adjustment pattern, in some instances it is difficult to detect the change in lightness. For example, Y ink in general is visually recognized as yellow by absorbing light other than wavelengths in the neighborhood of yellow of visible light. Since the integral value of absorption percentage of Y ink is lower than that of ink of other colors, yellow is visually recognized as a color that has high lightness.

Therefore, when an adjustment pattern is printed using Y ink on a white printing medium (the state illustrated in the second row from the bottom in FIG. 3), the difference between the lightness of bars constituting each pattern and the lightness of the base color of the printing medium, white, is small. The small difference in lightness makes it difficult for the detection circuit 42 to find the pattern that has the highest lightness. To provide a solution, the controller 20 prints an undercoat using C ink before printing an adjustment pattern using Y ink. That is, the controller 20 controls the carriage 40 and the transportation mechanism 60 to print a painted-solid pattern that is an undercoat with a fixed amount of ink per unit area throughout an area that is wider than an area where printing using Y ink is to be performed.

After printing the undercoat, the controller 20 performs a calibration such that the lightness of the undercoat will become the maximum lightness of the detectable range of the detection circuit 42. The greater the intensity of the lightness is, the greater the detection value (voltage) outputted by the detection circuit 42 is. However, the maximum value and the minimum value of the detection value do not change. On the other hand, it is possible to change the intensity of the lightness corresponding to each detection value by performing a calibration.

In the present embodiment, a calibration is performed by varying the amount of light emitted from the LED 42b. That is, the calibration is performed such that the detection value outputted by the detection circuit 42 will become a predetermined maximum value (for example, a voltage of 3 V) when white (i.e., the color that has the highest lightness), which is the color of the printing medium itself, is read while emitting light from the LED 42b by a predetermined amount of emission. On the other hand, the controller 20 performs a calibration for reading an adjustment pattern when the adjustment pattern is to be read.

That is, the controller 20 performs the calibration such that the lightness that has been made darker as compared with white background due to the presence of the cyan undercoat formed using C ink will become the maximum value of the detection value outputted by the detection circuit 42 (for example, a voltage of 3 V). Specifically, the controller 20 controls the detection circuit 42 and performs the calibration such that the detection value outputted when the cyan undercoat is read while increasing the amount of light emitted from the LED 42b will become the predetermined maximum value. As a result, even a color that would be detected with a less detection value if a calibration were performed with respect to the base color of the printing medium becomes able to be detected with a greater detection value. Therefore, it becomes possible to detect a change in lightness in more details.

In the present embodiment, the controller 20 commands that patterns should be printed using Y ink inside the area where the cyan undercoat has been printed, in a state in which the calibration explained above has been performed. That is, the controller 20 controls the carriage 40 and the transportation mechanism 60 to print each pattern made up of a plurality of bars by using Y ink inside the area where printing has been performed using C ink. In the present embodiment, used as a color that has a complementary-color relationship with Y ink (the meaning of the term "complementary color" used herein is not limited to a strict meaning of the complementary color) is C ink, which is closest in color to the complementary color of Y ink among the colors of ink used by the printing apparatus 10. Therefore, it is possible to perform printing with a high contrast between the cyan undercoat and the patterns.

FIGS. 5 to 8 are diagrams for explaining the effects of performing the above-described calibration for reading an adjustment pattern and the above-described selection of ink having a complementary-color relationship. The horizontal axis of each graph in FIGS. 5 to 8 represents wavelengths. The graph shows the wavelengths of light read by the lightness sensor 42a or the absorption percentage of light absorbed by ink.

Figure 5:
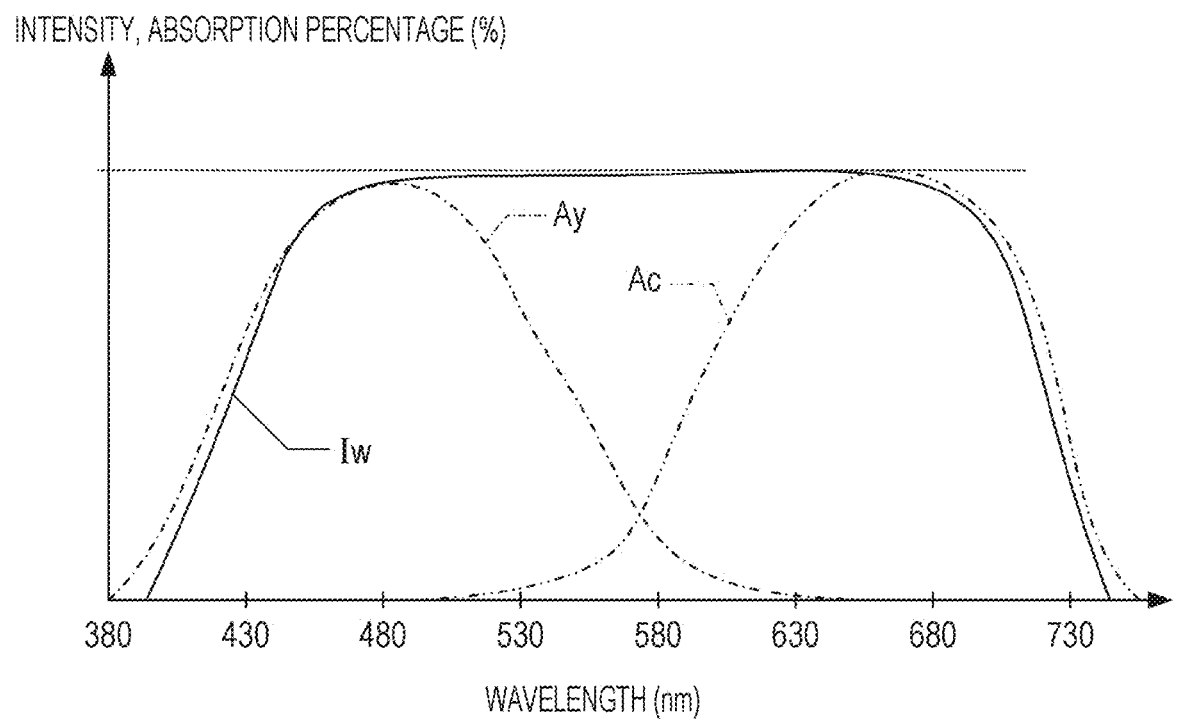
FIG. 5 is a diagram for explaining spectrum absorption by ink.

In FIG. 5, the solid-line curve represents intensity Iw for wavelengths when the base color of a printing medium (white) is read by the lightness sensor 42a. The intensity is a relative value and is normalized, with the maximum value taken as 100%. The dot-and-dash line curve represents absorption percentage Ay for wavelengths of Y ink. The double-dotted dashed line curve represents absorption percentage Ac for wavelengths of C ink. The absorption percentage is a relative value and is normalized, with the maximum value taken as 100%. In the description below, a case where there is a relationship illustrated in FIG. 5 among the values of the intensity Iw, the absorption percentage Ay, and the absorption percentage Ac is taken as an example. FIGS. 5 to 8 are just for schematic illustration. The value for each wavelength of actual ink and an actual printing medium could be different and could change in a more complicated manner.

Figure 6:
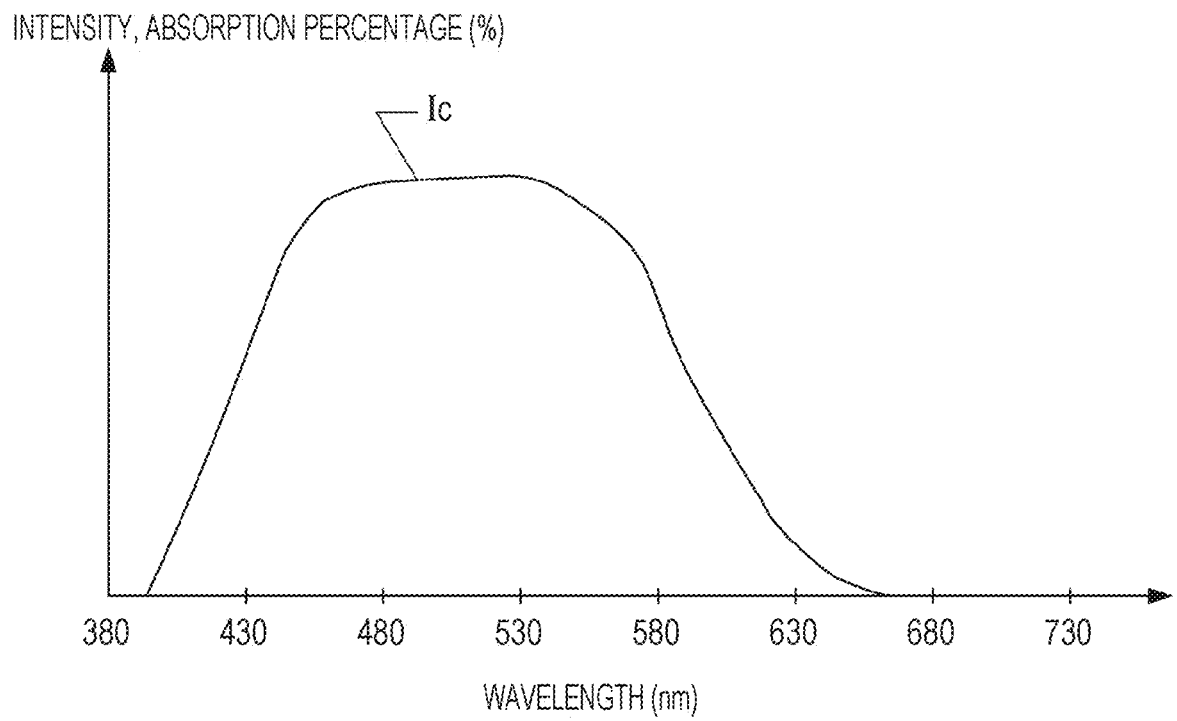
FIG. 6 is a diagram for explaining the distribution of light after absorption by cyan ink.

When C ink is printed as an undercoat on a printing medium, light having the intensity Iw is absorbed in accordance with the absorption percentage Ac of C ink. FIG. 6 schematically illustrates the intensity Ic of light when light having the intensity Iw is absorbed by C ink. Since only a part of the wavelengths of the base color of the printing medium is detected due to the printed undercoat, the color of the undercoat will be perceived as cyan, which is a chromatic color. The lightness of the intensity Iw corresponds to a value obtained by integrating the product of the intensity Iw illustrated in FIG. 5 and the sensitivity of the lightness sensor 42a. The lightness of the intensity Ic corresponds to a value obtained by integrating the product of the intensity Ic illustrated in FIG. 6 and the sensitivity of the lightness sensor 42a. Therefore, the lightness is low when the undercoat is printed in cyan.

Figure 7:
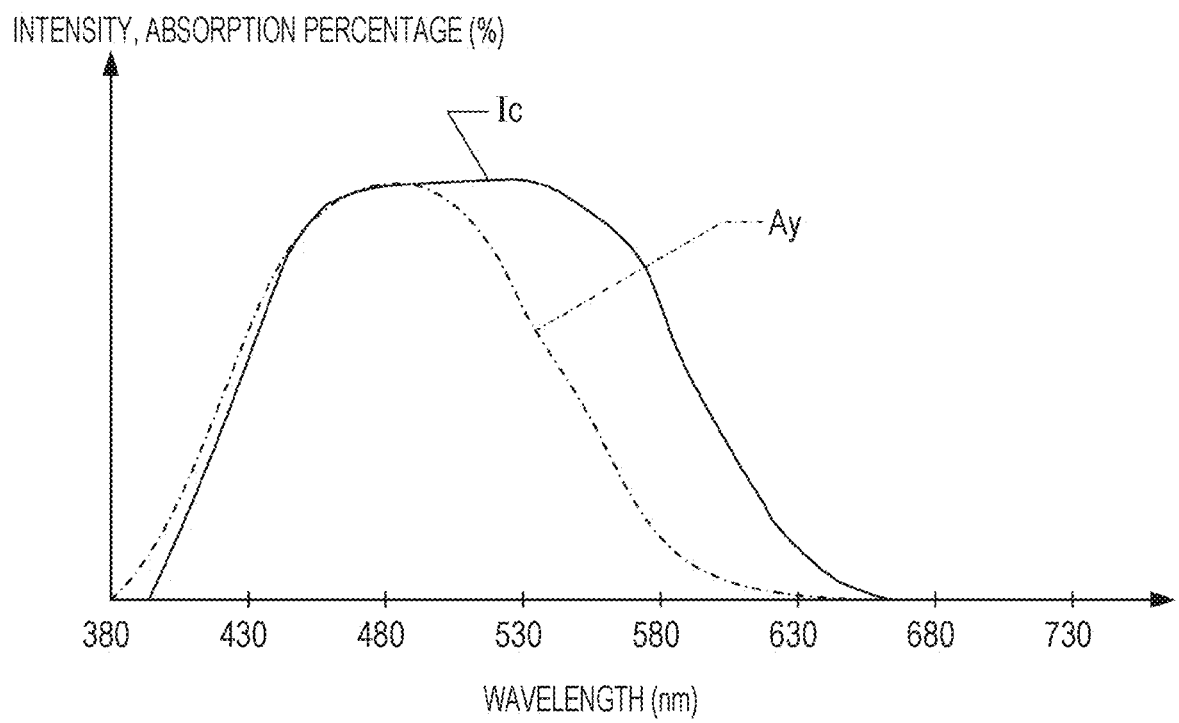
FIG. 7 is a diagram for explaining the distribution of light after absorption by cyan ink and explaining spectrum absorption by yellow ink.

The above-described calibration for reading an adjustment pattern is a calibration for detecting, as the maximum value of the detection value of the lightness sensor 42a, lightness obtained when a color made darker due to the presence of the cyan undercoat than the base color of the printing medium, that is, white, is irradiated with a predetermined amount of light. In the present embodiment, each pattern made up of a plurality of bars is printed using Y ink after performing this calibration. FIG. 7 is a graph showing that the absorption percentage Ay of Y ink is superposed on the distribution of the intensity Ic illustrated in FIG. 6. As illustrated in FIG. 7, many wavelengths at which the absorption percentage of Y ink is high overlap with the distribution of the intensity Ic.

That is, since Y ink and C ink are in a complementary-color relationship with each other, the peak in the absorption percentage of Y ink and the peak in the absorption percentage of C ink do not overlap with each other, as illustrated in FIG. 5. Nor is there an overlap between the high-absorption portion in the neighborhood of the peak of the former and the high-absorption portion in the neighborhood of the peak of the latter at many wavelengths. Therefore, the intensity Ic of the portion left after absorption by C ink from the intensity Iw overlaps at many wavelengths with the absorption percentage of Y ink as illustrated in FIG. 7.

For this reason, when Y ink is printed on the undercoat that has been printed using C ink, light at this portion is absorbed by Y ink and, therefore, intensity Icy illustrated in FIG. 8 is detected. That is, the mixed color of the portion where both C ink and Y ink have been printed is perceived as a greenish color because of the light left after absorption in accordance with the absorption percentage of Y ink and the absorption percentage of C ink from the base color of the printing medium.

The lightness of the mixed color corresponds to a value obtained by integrating the product of the intensity Icy illustrated in FIG. 8 and the sensitivity of the lightness sensor 42a. Therefore, a high contrast relative to the lightness of the color of the undercoat illustrated in FIG. 7 (the integration value of the intensity Ic illustrated in FIG. 7) can be obtained. In the present embodiment, since the calibration for reading an adjustment pattern is performed, lightness that is manifested by the intensity Ic is detected as the maximum value of lightness that is detectable by the detection circuit 42. Therefore, as compared with a case where a calibration is performed with respect to white, which is the color of the printing medium itself, a greater value will be obtained as the detection value of lightness of Y ink. This makes it easier to read the adjustment pattern. Therefore, it is possible to read the adjustment pattern accurately by the detection circuit 42.

After printing the adjustment pattern, the controller 20 controls the transportation mechanism 60 to move the printing medium to a position where the detection circuit 42 is able to read the portion at which the adjustment pattern has been printed. Then, the controller 20 causes the detection circuit 42 to read each of the patterns that constitute the adjustment pattern while controlling the carriage 40 so as to cause the carriage 40 to move in the main-scan direction.

After reading each of the patterns Pt that constitute the adjustment pattern, the controller 20 acquires the lightness of each pattern. Then, based on the adjustment pattern data 30a, the controller 20 acquires the amount of adjustment associated with the pattern that has the highest lightness. In the example illustrated in FIG. 3, the amount of adjustment associated with the pattern Ptx among those in the adjustment pattern at the bottom row is acquired.

The controller 20, after acquiring the amount of adjustment, sets parameters that are to be used for controlling the printing apparatus 10 with the amount of adjustment. With the above-described configuration, it is possible to manufacture the printing apparatus 10 which is capable of performing printing with high quality and for which an adjustment has been made based on an adjustment pattern that is readable accurately by the detection circuit 42. Moreover, the printing apparatus 10 manufactured in this way is able to perform printing in an accurately adjusted state.

(3) Adjustment Processing

FIG. 9 is a flowchart of adjustment processing performed using an adjustment pattern. The adjustment processing can be performed for each adjustment pattern represented by the adjustment pattern data 30a. The adjustment processing illustrated in FIG. 9 starts when arbitrary one of the adjustment patterns is designated as the target of printing and an adjustment using the designated adjustment pattern starts.

Upon the start of the adjustment processing, the controller 20 determines a first undercoat color (step S100). That is, the adjustment pattern data 30a shows the silhouette and color of each of the patterns that constitute the adjustment pattern designated as the target of printing. Therefore, based on the adjustment pattern data 30a representing the adjustment pattern designated as the target of printing, the controller 20 identifies the color of the adjustment pattern designated as the target of printing. Then, the controller 20 determines, as the first undercoat color, the color of ink that has a complementary-color relationship with the color of the adjustment pattern designated as the target of printing.

The color that has a complementary-color relationship with the color of the adjustment pattern is predetermined and pre-stored in the nonvolatile memory 30, etc. For example, the color that has a complementary-color relationship with yellow is predetermined as cyan. The controller 20 looks up the nonvolatile memory 30 to determine the color that has a complementary-color relationship as the first undercoat color. For example, the first undercoat color is cyan if the color of each of the patterns that constitute the adjustment pattern is yellow. The first undercoat color is yellow if the color of each of the patterns that constitute the adjustment pattern is cyan.

Next, the controller 20 commands that an undercoat should be printed using the first undercoat color (step S105). That is, the controller 20 controls the carriage 40 and the transportation mechanism 60 to print a painted-solid pattern of the first undercoat color throughout a predetermined area that is wider than an area where the patterns that constitute the adjustment pattern are to be printed.

Next, the controller 20 performs a calibration in steps S110 to S120. Specifically, the controller 20 sets the emission voltage of the LED 42b into the minimum value (step S110). That is, the minimum value of the emission voltage of the LED 42b has been determined in advance, and the controller 20 outputs a control signal to the detection circuit 42 to set the emission voltage of the LED 42b into the minimum value. As a result, the amount of light emitted from the LED 42b is minimized. It suffices here that the amount of light emitted can be controlled such that the detection value of the lightness of the first undercoat color by the detection circuit 42 is less than the maximum value of the detection value. In this sense, the emission voltage may be greater than the minimum value.

Next, the controller 20 determines whether the detection value has reached the maximum value or not (step S115). That is, the controller 20 acquires the detection value of the detection circuit 42 and determines whether the detection value has reached the predetermined maximum value (e.g., 3.0 V) or not. If it is not determined in the step S115 that the detection value has reached the maximum value, the controller 20 raises the emission voltage by a predetermined amount (step S120). That is, the controller 20 outputs a control signal to the detection circuit 42 to make the emission voltage of the LED 42b higher than the preceding setting value by the predetermined amount (e.g., 0.1 V). As a result, the amount of light emitted from the LED 42b increases by the predetermined amount. After executing the step S120, the controller 20 loops back to the step S115 for repetitive processing.

If it is determined in the step S115 that the detection value has reached the maximum value, the controller 20 commands that the adjustment pattern should be printed using the first pattern color (step S125). That is, the controller 20 looks up the nonvolatile memory 30 to acquire the adjustment pattern data 30a representing the adjustment pattern designated as the target of printing. Then, based on the adjustment pattern data 30a, the controller 20 controls the carriage 40 and the transportation mechanism 60 to print the adjustment pattern.

Next, the controller 20 commands that the adjustment pattern should be read (step S130). That is, the controller 20 controls the transportation mechanism 60, the carriage 40, and the detection circuit 42 to read the adjustment pattern printed in the step S125. As a result of this reading, based on an output signal from the detection circuit 42, the controller 20 acquires the lightness of each of the patterns that constitute the adjustment pattern.

Next, the controller 20 sets parameters (step S135). That is, the controller 20 acquires the amount of adjustment associated with the pattern that has the highest lightness among the patterns that constitute the adjustment pattern read in the step S130. The controller 20 determines each parameter that needs to be set in each component of the printing apparatus 10 in order to perform printing with this adjustment amount. Then, the controller 20 causes the nonvolatile memory 30 to store these parameters. As a result of going through the steps described above, the printing apparatus 10 becomes able to perform printing using the set parameters.

(4) Other Embodiments

The foregoing embodiment is just for giving an example. Various other embodiments can be adopted. For example, the printing apparatus 10 may be integrated into an apparatus that has a print function and other functions. The printing apparatus 10 may use other printing method instead of ink-jet printing, for example, electrophotographic printing. Moreover, the technique described in the foregoing embodiment, specifically, a technique of printing an undercoat using the first undercoat color, performing a calibration, and thereafter printing an adjustment pattern using the first pattern color that has a complementary-color relationship with the first undercoat color, can be implemented as an invention of a printing apparatus, an invention of an adjustment pattern printing program that is to be executed by a computer, for example.

The functions recited in the appended claims may be implemented by hardware resources the functions of which are defined by hardware architecture itself, by hardware resources the functions of which are defined by a program, or by a combination of them. These functions of components do not necessarily have to be implemented by physically independent hardware resources. Moreover, since the foregoing embodiment is just for giving an example, partial omission of the disclosed configuration, addition of other configuration to the disclosed configuration, and/or replacement may be applied.

Furthermore, the target of adjustment, for which an adjustment is made using an adjustment pattern, is not limited to the timing of ejecting ink described in the foregoing embodiment. Nor is the adjustment pattern limited to the foregoing example. Furthermore, the calibration is not limited to the foregoing example of adjusting the range of lightness that can be detected by the detection circuit 42 with respect to the first undercoat color by increasing the amount of light emitted from the LED 42b. For example, the calibration may be performed by adjusting the amplification factor of the output of the lightness sensor 42a of the detection circuit 42. Specifically, the detection value of the detection circuit 42 is a value obtained by amplifying the detection value of the lightness sensor 42a by a certain amplification factor.

Therefore, it is possible to vary the detection value of the detection circuit 42 corresponding to the same lightness by varying the amplification factor. Accordingly, the controller 20 makes an adjustment such that, by varying the amplification factor, the detection value that is obtained when the lightness of the first undercoat color is detected will become the maximum value of the detection value. The following configuration can be adopted for realizing this. For example, in the flowchart illustrated in FIG. 9, the amplification factor that is to be applied to the detection circuit 42 is set into the minimum value in the step S110, and it is determined whether the detection value has reached the maximum value or not in the step S115. Then, in the step S120, the amplification factor is increased by a predetermined amount. With this configuration, it is possible to perform a calibration such that the detection value of the first undercoat color will become the maximum value of the detection value in a state in which it is determined in the step S115 that the detection value has reached the maximum value. As another example, the calibration may be performed by increasing sensor exposure time. These examples may be combined.

The detection circuit needs only to be able to acquire information for making an adjustment by reading an adjustment pattern. Therefore, the detection circuit needs only to be able to detect the lightness if information is to be read based on the lightness (density) of an adjustment pattern. The detection circuit may be equipped with a CCD sensor or a CMOS sensor, etc. with a color filter if the color of an adjustment pattern is to be read by the detection circuit.

The detectable range of the detection circuit is a range in which it is possible to detect the intensity of the target of detection (e.g., lightness). This range is variable. That is, the detection circuit expresses the intensity of the target of detection in terms of the detection value of a voltage, etc., wherein the relationship between the intensity and the detection value is variable. For example, it is possible to change by setting between a state in which the base color of a printing medium, white, is the maximum value of the detection value by default and a state in which the detection value of a printing medium with an undercoat printed thereon using the first undercoat color is the maximum value of the detection value. As explained here, even when detection values that can be obtained as the result of detection by the detection circuit are within a certain range, the intensity meant by each detection value can be changed. Therefore, in this sense, the detectable range of the intensity of the target of detection is variable.

It suffices that printing using the first undercoat color is performed such that not the color of a printing medium itself but the first undercoat color becomes the color of background against an adjustment pattern. Therefore, it will be advantageous if the first undercoat color is applied uniformly (i.e., printed as a painted-solid pattern) so that the first undercoat color will be recognized as a color different from the color of the printing medium itself. Printing an undercoat using a single color component as the first undercoat color will be advantageous for making an adjustment efficiently. However, if it is preferred to make an adjustment with high accuracy at the sacrifice of efficiency, the undercoat may be printed using a mixture of plural color components as the first undercoat color. The first undercoat color and the first pattern color are in a complementary-color relationship with each other. That is, it suffices that the wavelength band of light absorbed in a state in which there is a print of the first undercoat color and the wavelength band of light absorbed in a state in which there is a print of the first pattern color are different from each other.

Specifically, when printing with various kinds of color is performed using ink, if the color is chromatic, there is a peak in absorption percentage for wavelengths, and the absorption percentage decreases as the wavelength increases or decreases in the neighborhood of the peak. The larger the difference between the wavelength at which the absorption percentage peaks for a certain color and the wavelength at which the absorption percentage peaks for another color is, the closer the relationship between these two colors is to a complementary-color relationship. The smaller the overlap between the distribution including the peak of a certain color and the distribution including the peak of another color is, the closer the relationship between these two colors is to a complementary-color relationship. Since the number of colors of ink used in a printing apparatus is limited, ink of two colors that are closest to a complementary-color relationship may be regarded as complementary to each other. When ink of the first pattern color that is the color of an adjustment pattern has been determined, therefore, the first undercoat color is the color selected as being most complementary thereto, based on the characteristics of the ink of the first pattern color.

The printing medium may be any medium as long as the printing apparatus is able to perform printing on it. The printing medium may be paper or a non-paper medium. Anyway, it is sufficient as long as printing an undercoat using the first undercoat color makes the background color different from the color of the printing medium itself. Therefore, the color of the printing medium may be other color, instead of white. For example, it is sufficient as long as the color of the printing medium is different from the first undercoat color.

It suffices that the detection circuit is calibrated with respect to the first undercoat color. That is, it is sufficient as long as the calibration is performed such that the detectable range of the detection circuit will become more suited for the result of reading the first undercoat color than it is before the calibration. Therefore, various kinds of configuration may be adopted instead of the configuration described in the foregoing embodiment, in which the calibration is performed such that the detection value of the first undercoat color will become the maximum value of the detectable range. For example, it suffices that the calibration is performed such that the range of lightness read in the detectable range is made narrower, as compared with setting in which the base color of the printing medium is the maximum value of the detectable range.

The first pattern color may be any color that can be used in the printing apparatus. It will be advantageous if the first pattern color is the same as a color that can be used in the printing apparatus (that is, if an adjustment pattern is printed using ink of this color). An adjustment pattern may be printed using each of all colors that can be used in the printing apparatus, and undercoating may be performed for all of them. Alternatively, an adjustment pattern may be printed using each of all colors that can be used in the printing apparatus, and undercoating may be performed for only a part of them. Undercoating may be omitted when an adjustment pattern is printed using a color that is detectable sufficiently even without an undercoat, for example, black ink.

The adjustment pattern may be any series of patterns as long as they are printed while varying the amount of adjustment of the target of adjustment. In order to know an ideal adjustment amount, it will be advantageous if the adjustment pattern is formed by printing the same patterns while making the amount of adjustment different from pattern to pattern. The target of adjustment may be any factor among variable factors of the printing apparatus as long as it could change the result of printing. For example, if it is possible to adjust the amount of an error by varying the amount of adjustment of a particular factor in the printing apparatus, this particular factor is the target of adjustment. Examples of the error are: an error in the amount of movement and/or the direction of movement when a print head reciprocates, a print head level error, a platen gap error, a carriage speed error, an error between a plurality of print heads of a multi-head printing apparatus, an error in the amount of paper feed, and a nozzle pitch error.

The target of adjustment for which the amount of such an error is adjusted could be a plurality of targets of adjustment. Examples of the target of adjustment are: the timing of ejecting ink, the speed of moving the print head, the amount of ink ejected, the waveform and magnitude of a voltage for ejecting ink, the amount of feeding a sheet, as described earlier. Needless to mention, examples are not limited to those enumerated here, and an adjustment with the amount of adjustment may be made for any other kind of target of adjustment. The printing apparatus for which an adjustment is made is not limited to an ink-jet printer. Needless to mention, the target of adjustment may contain a plurality of items. The amount of adjustment may be a variable amount for each target of adjustment. When an adjustment pattern is printed, a plurality of adjustment amounts covering the entirety of an adjustable range may be selected, or a plurality of adjustment amounts covering a part of an adjustable range may be selected.

The adjustment based on the adjustment pattern is processing of determining an ideal adjustment amount of a variable factor of the printing apparatus based on the adjustment pattern and performing setting of the printing apparatus such that printing will be performed with the suitable amount of adjustment. Therefore, it is sufficient as long as the suitable amount of adjustment is determined based on the result of reading the adjustment pattern and as long as the parameter is set such that printing can be performed using this amount of adjustment. For example, an undercoat that is sufficiently larger than an adjustment pattern may be printed in advance, and, after printing the adjustment pattern, a calibration may be performed at, in the area of the undercoat, an area where the adjustment pattern is not printed.

What is claimed is:

1. A method for manufacturing a printing apparatus provided with a detection circuit, the method comprising:
    printing a first undercoat color on a printing medium;
    performing a calibration with respect to the printed first undercoat color;
    printing an adjustment pattern using a first pattern color that has a complementary-color relationship with the first undercoat color;
    detecting the adjustment pattern using the detection circuit after performing the calibration; and
    making an adjustment based on the detected adjustment pattern.

2. The method for manufacturing the printing apparatus according to claim 1, wherein the first undercoat color is cyan, and the first pattern color is yellow.

3. The method for manufacturing the printing apparatus according to claim 1, wherein the calibration is performed by adjusting an amplification factor of an output of a sensor of the detection circuit.

4. The method for manufacturing the printing apparatus according to claim 1, wherein the calibration is an adjustment of an amount of light emitted from a light source that is turned on when detection is performed by the detection circuit.

5. The method for manufacturing the printing apparatus according to claim 1, wherein the detection circuit is a circuit that acquires lightness of a surface of the printing medium.

6. A printing apparatus, comprising:
    a detection circuit; wherein
    a first undercoat color is printed on a printing medium;
    a calibration is performed with respect to the printed first undercoat color;
    an adjustment pattern is printed using a first pattern color that has a complementary-color relationship with the first undercoat color;
    the adjustment pattern is detected using the detection circuit;
    an adjustment is made based on the detected adjustment pattern; and printing is performed in accordance with setting after the adjustment.

* * * * *